United States Patent
Harmon (10) Patent No.: US 11,844,427 B2
(45) Date of Patent: Dec. 19, 2023

(54) SELF-SUSTAINED PORTABLE MUSIC STAND EXTENDER

(71) Applicant: Dustin Harmon, Hahira, GA (US)

(72) Inventor: Dustin Harmon, Hahira, GA (US)

( * ) Notice: Subject to any disclaimer, the term of this patent is extended or adjusted under 35 U.S.C. 154(b) by 0 days.

(21) Appl. No.: 17/716,305

(22) Filed: Apr. 8, 2022

(65) Prior Publication Data

US 2022/0322822 A1  Oct. 13, 2022

Related U.S. Application Data (60) Provisional application No. 63/172,510, filed on Apr. 8, 2021.

(51) Int. Cl.
| | |
|---|---|
| *A47B 23/00* | (2006.01) |
| *F16M 11/20* | (2006.01) |
| *F16M 11/38* | (2006.01) |
| *A47B 23/06* | (2006.01) |
| *F21V 21/24* | (2006.01) |

(52) U.S. Cl.
CPC ............ *A47B 23/004* (2013.01); *A47B 23/06* (2013.01); *F16M 11/2021* (2013.01); *F16M 11/38* (2013.01); *F21V 21/24* (2013.01)

(58) Field of Classification Search
CPC .. A47B 23/004; A47B 23/06; F16M 11/2021; F16M 11/38
USPC ......... 248/448, 277.1, 460, 442.2, 443, 444, 248/445, 446
See application file for complete search history.

(56) References Cited

U.S. PATENT DOCUMENTS

| | | | | |
|---|---|---|---|---|
| 1,085,620 | A * | 2/1914 | Loring | F16M 11/04 312/227 |
| 1,392,200 | A * | 9/1921 | Nakoney | A47B 23/06 248/448 |
| 1,467,896 | A * | 9/1923 | Juvet | G09B 29/10 40/514 |
| 1,562,393 | A * | 11/1925 | Vogt | A47B 23/004 248/462 |
| 1,699,176 | A * | 1/1929 | Zaremba | A47B 23/007 248/448 |
| 1,801,523 | A * | 4/1931 | Morris | A47B 19/00 248/448 |
| 1,840,620 | A * | 1/1932 | Dennis | A47B 23/043 248/462 |
| 1,869,278 | A * | 7/1932 | Ramelli | A61B 6/04 33/534 |
| 1,969,415 | A * | 8/1934 | Ostroff | B60R 1/081 248/277.1 |
| 2,356,532 | A * | 8/1944 | Rapfogel | A47B 23/004 248/462 |
| 3,437,002 | A * | 4/1969 | Defauw | A47B 23/004 84/453 |
| 3,447,770 | A * | 6/1969 | Gallamos | A47B 23/043 248/459 |

(Continued)

*Primary Examiner* — Nkeisha Smith
(74) *Attorney, Agent, or Firm* — THE RAPACKE LAW GROUP, P.A.; Andrew S. Rapacke (57) ABSTRACT

A portable music stand extender may include extendable arms constructed and arranged to expand and retract. The portable music stand extender may extend such that a user may position books, sheets, or printed paper in an upright position for ease of visibility. The portable music stand extender may retract when not in use to reduce the size of the extender and increase portability.

12 Claims, 5 Drawing Sheets

(56) References Cited

U.S. PATENT DOCUMENTS

| | | | | |
|---|---|---|---|---|
| 4,171,585 | A | * | 10/1979 | Macuka .................. A47B 97/02 40/518 |
| 4,579,303 | A | * | 4/1986 | Midlik ................ E04D 13/0722 52/741.1 |
| 5,016,852 | A | * | 5/1991 | Herendeen ............ A47B 23/06 248/455 |
| 5,511,758 | A | * | 4/1996 | Hsu ........................ F16M 13/00 248/461 |
| 6,682,042 | B2 | * | 1/2004 | Anderson ............ A47B 19/002 248/460 |
| 8,902,575 | B2 | * | 12/2014 | Zhou ...................... F16M 13/00 248/688 |
| 9,683,694 | B2 | * | 6/2017 | Shiba .................... F16M 11/10 |
| 9,730,345 | B2 | * | 8/2017 | Wu ........................ F16M 13/00 |
| 10,098,452 | B2 | * | 10/2018 | Ko ........................ F16M 11/041 |
| 10,487,977 | B2 | * | 11/2019 | Lo .......................... G06F 1/1681 |
| 10,661,592 | B2 | * | 5/2020 | Lucio ...................... F21V 21/32 |
| 2003/0106969 | A1 | * | 6/2003 | Dillon ................ A61M 5/1415 248/129 |
| 2003/0168569 | A1 | * | 9/2003 | Simson .................... G09F 1/10 248/448 |
| 2014/0326852 | A1 | * | 11/2014 | Le Gette .............. F16M 11/105 248/688 |
| 2015/0196151 | A1 | * | 7/2015 | Phipps .................. F16M 11/24 211/85.2 |
| 2017/0223161 | A1 | * | 8/2017 | Lau ........................ F16M 11/10 |

* cited by examiner

SELF-SUSTAINED PORTABLE MUSIC STAND EXTENDER

CROSS-REFERENCE TO RELATED APPLICATIONS

The present application claims priority to U.S. Provisional Patent Application No. 63/172,510 filed Apr. 8, 2021, entitled "SELF-SUSTAINED PORTABLE MUSIC STAND EXTENDER," which is hereby incorporated by reference in its entirety.

TECHNICAL FIELD

The embodiments generally relate to the field of music stands and music stand accessories.

BACKGROUND

Conventional music stands include an integrated stand and shelf portion designed to hold sheet music or the like in a relatively upright position. Conventional music stands typically hold one to two sheets of music at a time and may lack a modular design such that the shelf portion may be removed from the stand portion and compactly stored or carried.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

A portable music stand extender may include extendable arms constructed and arranged to expand and retract. The portable music stand extender may extend such that a user may position books, sheets, or printed paper in an upright position for ease of visibility. The portable music stand extender may retract when not in use to reduce the size of the extender and increased portability.

According to one aspect of the portable music stand extender, the extendable arms may comprise include scissoring mechanisms search that the portable music stand extender may extend and retract with ease.

According to one aspect of the portable music stand extender, a plurality of utensil compartments may be disposed on opposite ends of the extendable arms and may be constructed and arranged to hold a number of common items, such as, but not limited to, pens and pencils.

According to one aspect of the portable music stand extender, a smart device mount may be disposed on the body of the portable music stand extender and may be constructed and arranged to seat a smart device such as a phone, tablet, or the like. The smart device mount may additionally be constructed and arranged to hold items such as electronic metronomes.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

The specific details of the single embodiment or variety of embodiments described herein are set forth in this application. Any specific details of the embodiments are used for demonstration purposes only, and no unnecessary limitation or inferences are to be understood therefrom.

Before describing in detail exemplary embodiments, it is noted that the embodiments reside primarily in combinations of components related to the system. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to a portable music stand extender having extendable arms constructed and arranged to expand and retract. The portable music stand extender may extend such that a user may position books, sheets, or printed paper in an upright position for ease of visibility. The portable music stand extender may retract when not in use to reduce the size of the extender and increased portability. The portable music stand extender may be utilized by a musician while performing, during practice sessions, or otherwise during the acts of writing, playing, and/or editing music. Further, the portable music stand extender may enhance the musician's ability to view material associated with music.

A portable music stand extender may include a body portion from which at least one extendable arm may expand and retract. The portable music stand extender may extend such that a user may position books, sheets, or printed paper in an upright position for ease of visibility. The portable music stand extender may retract when not in use to reduce the size of the extender and increase portability.

The body portion may be generally rectangular in shape and may include a first face opposite of second face, wherein the extendable arms may be disposed on the first face and second face such that the portable music stand extender may expand and retract. The body portion may further include a third face opposite of fourth face, wherein the third face and fourth face are approximately perpendicular to the first face and second face. The fourth face may feature a kickstand disposed thereon or integrated therein. The kickstand may be hingedly attached to the body portion such that the portable music stand extender may be positioned on a flat surface, the kickstand may be positioned in an outward position away from the body portion, and the portable music stand extender may sit in an approximately upright position. The smart device mount may be disposed on the third face.

Alternatively, the body portion may be generally rectangular in shape and may be mechanically attached to the extendable arms such that the portable music stand extender may expand and retract. The body portion may include a third face having an extension indicator disposed thereon. The extendable arms may be affixed to the body portion in such a way that when expanded or retracted, a portion of the extendable arms, such as a hinge pin, is visible near the extension indicator such that a user can understand, via the extension indicator, how far or near the extendable arms are from the body portion. The extension indicator may include numerical indicators that communicate to a user how many sheets books, or printed paper can be supported by the portable music stand extender. As a nonlimiting example, a portion of the extendable arms may be mechanically mated with a channel or channels defined by the body portion and which a portion of the extendable arms may slidably travel therein when the extendable arms are extended or retracted.

The at least one extendable arm may include scissoring mechanisms such that the portable music stand extender may extend and retract with ease. The at least one extendable arm may include a base affixed to a scissoring arm comprising a plurality of struts and pins arranged in an approximately cross-hatching arrangement. The scissoring arm may include a plurality of stabilizing struts constructed and arrange to guide and strengthen the scissor arm. The at least one extendable arm may be two extendable arms positioned on opposite sides of the body portion. At least one clip or a plurality of clips may be disposed on each of the extendable arms and may be constructed and arranged to assist a user in securing sheets, books, and paper as needed.

A plurality of utensil compartments may be disposed on an end of the extendable arms and may be constructed and arranged to hold a number of common items, such as, but not limited to, pens and pencils. The utensil compartments are designed to allow the user to press the pencil down, so it does not fall out during transport but is still easily and readily removable by pushing the pencil upwards.

A smart device mount may be disposed on the body of the portable music stand extender and may be constructed and arranged to seat a smart device such as a phone, tablet, or the like. The smart device mount may additionally be constructed and range to hold items such as electronic metronomes. The smart device mount may include and shelf and lip protruding from the body portion to securely support a smart device or item placed thereon.

Figure 1:
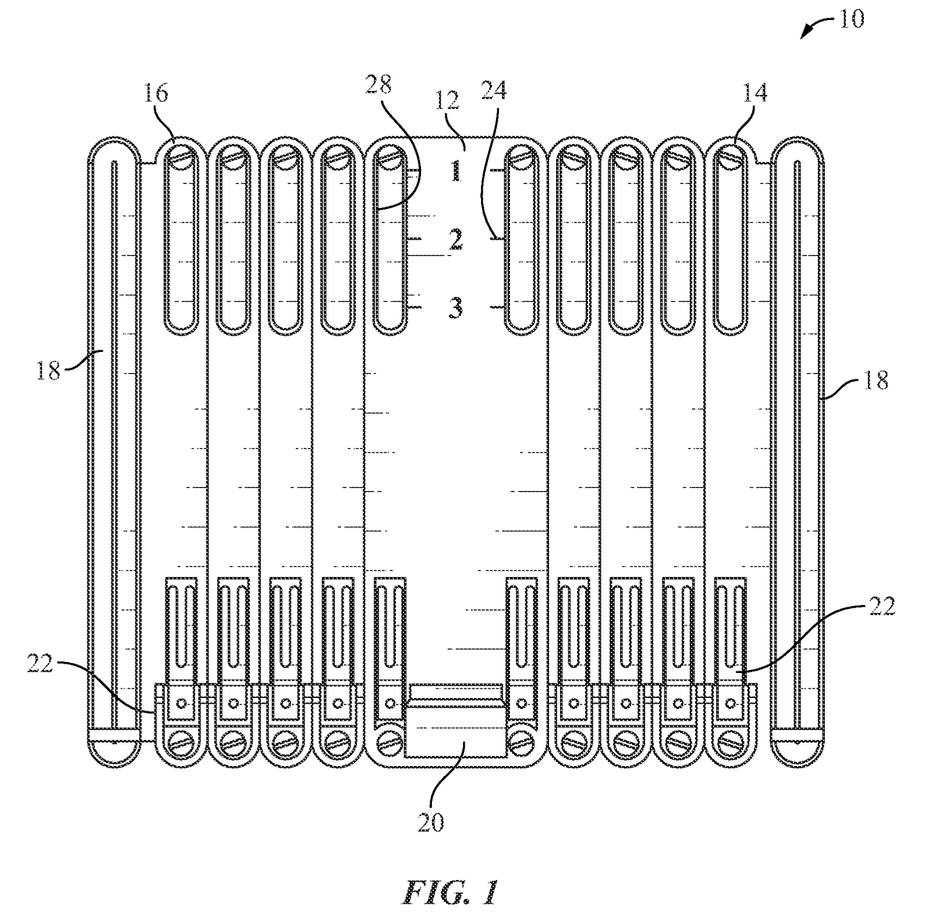
FIG. 1 illustrates a front-facing view of a portable music stand extender in a retracted position, according to some embodiments.
Figure 2:
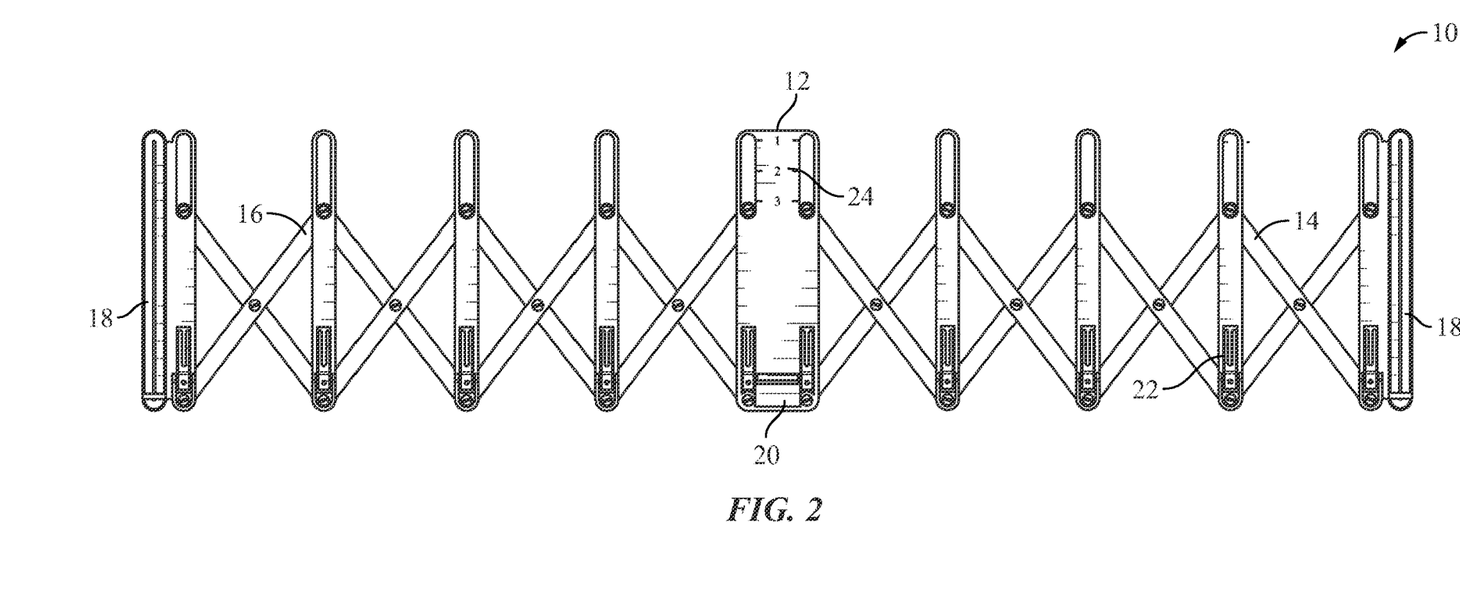
FIG. 2 illustrates a front-facing view of a portable music stand extender in an extended position, according to some embodiments.

Referring to FIG. 1 and FIG. 2, a portable music stand extender 10 may include a body portion 12 including an extension indicator 24. A smart device mount 20 may be disposed on the body portion. At least one extendable arm may include a first extendable arm 14 and a second extendable arm 16 disposed opposite one another on the body portion 12 each of the extendable arms 14, 16 may include at least one clip 22 and at least one utensil compartment 18. The body portion 12 may define at least one channel 28 which the extendable arms 14, 16 may be mechanically connected to. The at least one channel 28 may include a plurality of channels such as a first channel mechanically connected to the first extendable arm 14 and a second channel mechanically connected to the second extendable arm 16. As best seen in FIG. 1 the portable music stand extender 10 may be constructed and arranged to retract into a compact, closed position. As best seen in FIG. 2, the portable music stand extender 10 may be constructed and arranged to extend into an expanded, open position.

Figure 3:
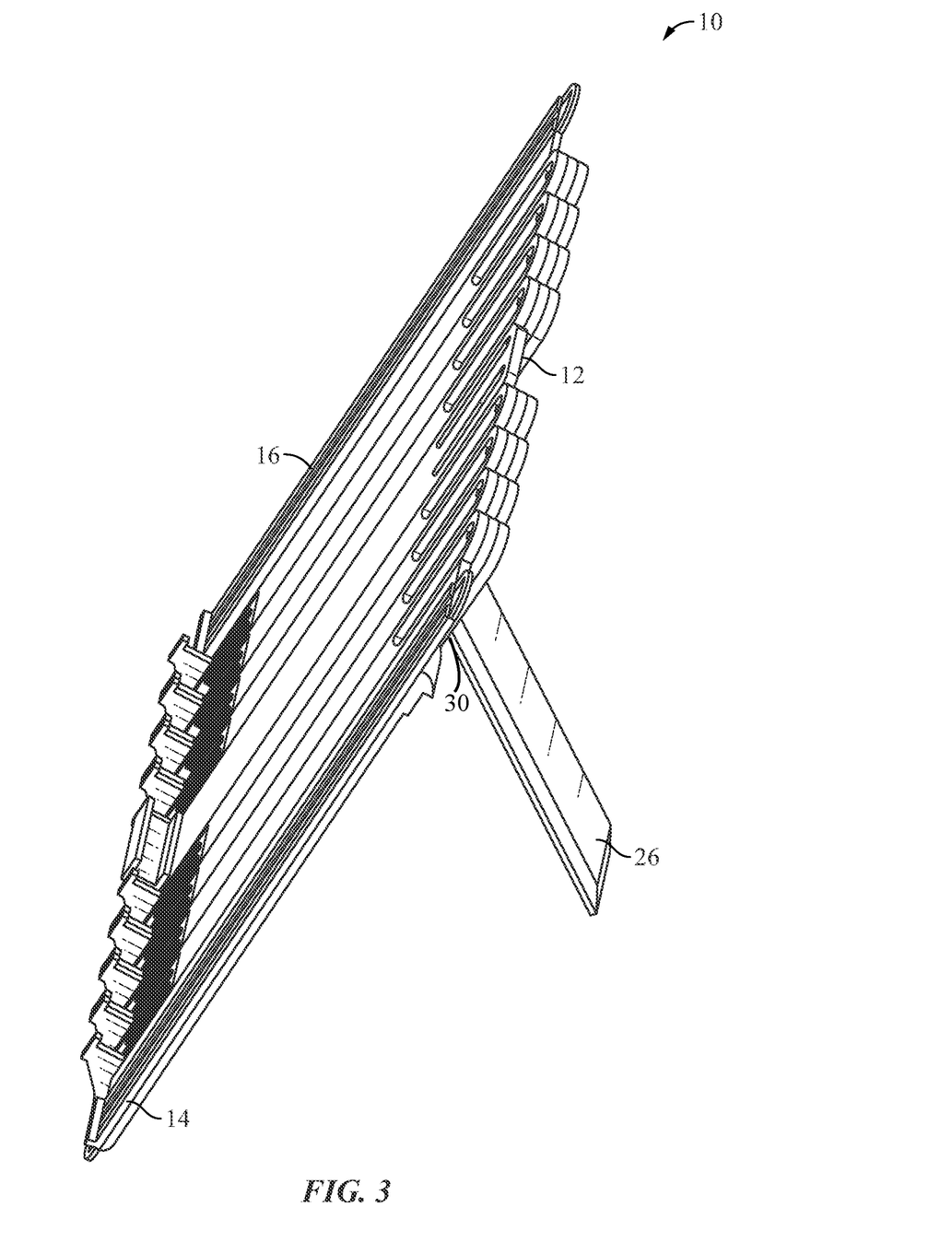
FIG. 3 illustrates a side view of a portable music stand extender having a kickstand integrated therein, according to some embodiments.

Referring to FIG. 3, a portable music stand extender 10 may include a first extendable arm 14 and a second extendable arm 16 connected to a body portion 12 disposed there between the body portion 12 may include a kickstand 26 constructed and arranged to support the portable music stand 10 when seated on a surface. The kickstand 26 may be collapsible such that it may be stored within a cavity defined by the body portion when not in use.

In some embodiments, the kickstand 26 may include one or more lockable positions to allow the portable music stand 10 to be retained at variable angles when the kickstand 26 is extended. In such, the user may adjust the angle of the portable music stand 10 using the kickstand 26 to suit their needs. This feature may be especially useful for musicians who interact with the portable music stand 10 in variable positions (i.e., those who interact with the portable music stand 10 sometimes while standing and sometimes while seated). This may also aid those using the portable music stand 10 in variable environments to ensure they may always optimally view the material presented by the portable music stand 10. To operate the kickstand 26, the use may pivot the kickstand 26 via a pivot and slide 30. This pivot and slide 30 allows the kickstand 26 to be readily extended and locked in one or more suitable positions (one of which being shown in FIG. 3).

Figure 4:
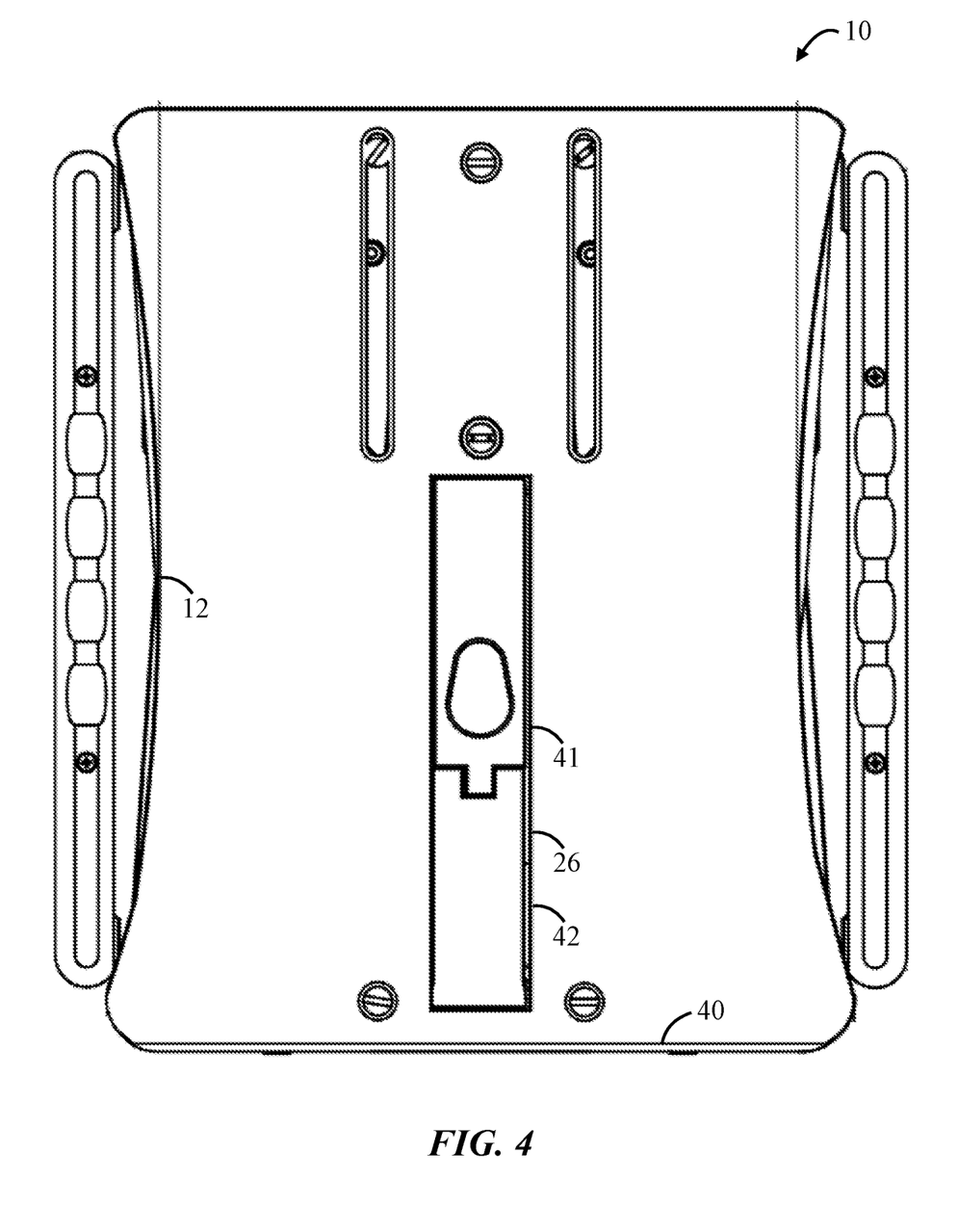
FIG. 4 illustrates a rear-facing view of the portable music stand extender in a retracted position, according to some embodiments.

FIG. 4 illustrates a rear-facing view of the portable music stand extender 10 in a retracted position, according to an exemplary embodiment. The rear side 40 of the body portion 12 is shown having the pivotable kickstand 26 mounted thereon. The kickstand 26 may be provided in a kickstand cavity 41 which allows the kickstand 26 to be flush with the surface 42 of the rear side 40 of the body portion 12. In such, the portable music stand extender 10 may lie flat on the rear side 40 during use or during storage.

In some embodiments, the kickstand 26 includes a slide on the top portion to allow the user to slide and lock the kickstand 26 in various positions, thus changing the presentation angle of the portable music stand extender 10.

Figure 5:
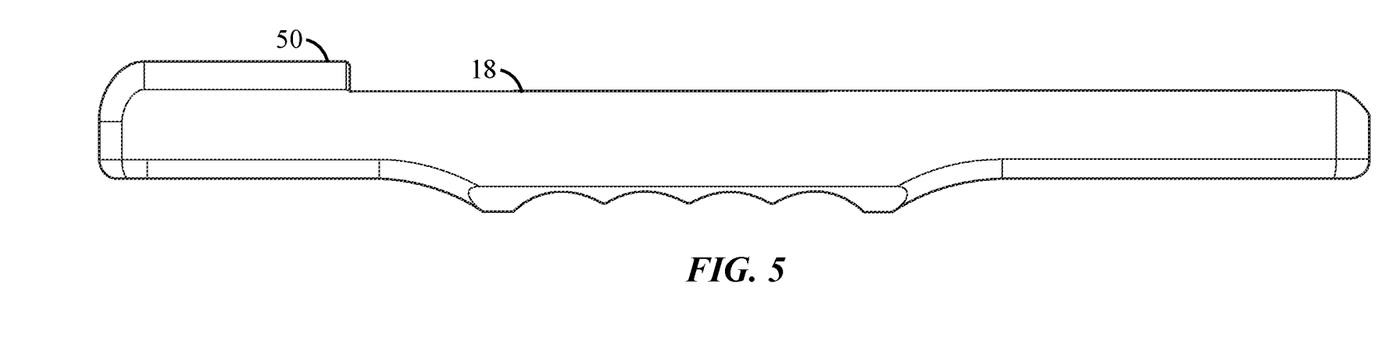
FIG. 5 illustrates a side elevation view of the utensil compartment, according to some embodiments.
Figure 6:
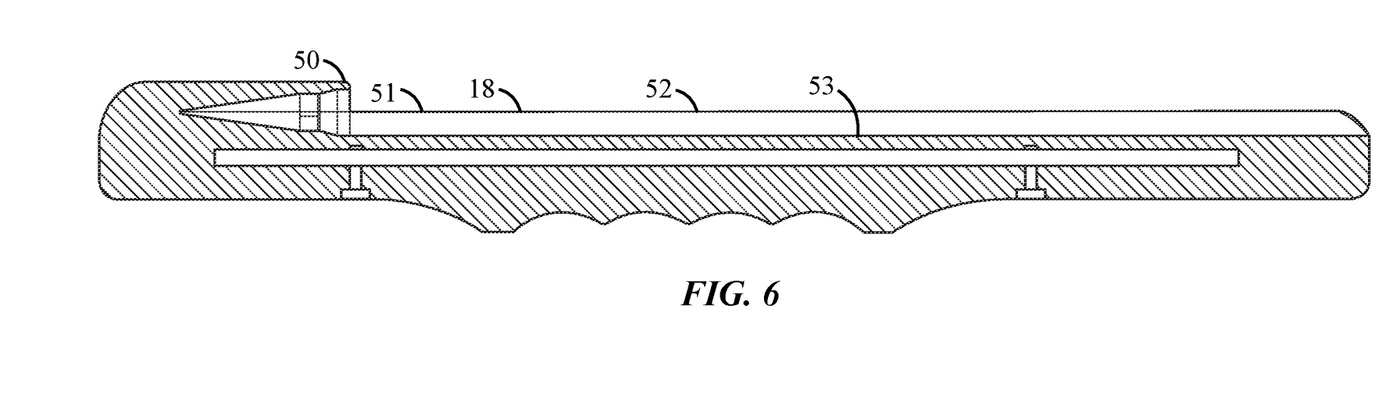
FIG. 6 illustrates a cross-section view of the utensil compartment, according to some embodiments.

FIG. 5 illustrates a side elevation view of the utensil compartment 18 having a housing 50 which contains a utensil cavity 51 (see FIG. 6). The utensil compartment 18 may be removable engaged with the portable music stand extender 10. For example, the utensil compartment 18 may be slidingly engaged, or engaged via a clip or similar mechanism.

FIG. 6 illustrates a cross-section view of the utensil compartment 18 having a housing 50 and a utensil cavity 51 to receive a utensil 52 therein. The utensil 52 is retained within the utensil cavity 51 via a friction fit with the sidewall(s) 53 of the utensil cavity 50.

The following description of variants is only illustrative of components, elements, acts, products, and methods considered to be within the scope of the invention and are not in any way intended to limit such scope by what is specifically disclosed or not expressly set forth. The components; elements, acts, products, and methods as described herein may be combined and rearranged other than as expressly described herein and are still considered to be within the scope of the invention.

According to variation 1, a portable music stand extender may include a body portion defining at least one channel and comprising an extension indicator, a kickstand, and a smart device mount; at least one extendable arm in mechanical communication with the at least one channel, and wherein the at least one extendable arm is a scissoring arm comprising a plurality of struts and hinge pins arranged in an approximately cross-hatching arrangement; at least one clip disposed on the at least one extendable arm; and at least one utensil compartment disposed on the at least one extendable arm.

According to variation 2, A portable music stand extender may include a body portion defining a first channel and a second channel and comprising an extension indicator, a kickstand, and a smart device mount; a first extendable arm in mechanical communication with the first channel, and wherein the first extendable arm is a scissoring arm comprising a plurality of struts and pins arranged in an approximately cross-hatching arrangement, a first dip disposed on the first extendable arm; a first utensil compartment disposed on first extendable arm; a second extendable arm in mechanical communication with the second channel, and wherein the second extendable arm is a scissoring arm comprising a plurality of struts and pins arranged in an approximately cross-hatching arrangement; a second dip disposed on the second extendable arm; a second utensil compartment disposed on second extendable arm, and wherein the first extendable arm and second extendable arm are constructed and arranged to retract and expand to and from the body portion.

In some embodiments, the portable music stand extender may be constructed using 3-Dimensional OD) printing technologies using carbon fiber filament. One skilled in the arts will readily understand that the portable music stand extender may be constructed using CNC machining, injection molding, and similar processes known in the arts.

In some embodiments, the portable music stand extender may include one or more mounts for accepting an accessory. The accessory may include a light or other device to aid the user in viewing or otherwise interacting with contents on the portable music stand extender.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

It will be appreciated by persons skilled in the art that the present embodiment is not limited to what has been particularly shown and described hereinabove. A variety of modifications and variations are possible in light of the above teachings without departing from the following claims.

What is claimed is:

1. A portable music stand extender, comprising:
    a body portion defining at least one channel and a second channel, and comprising an extension indicator, a kickstand, and a smart device mount;
    at least one extendable arm in mechanical communication with the at least one channel, and wherein the at least one extendable arm is a scissoring am comprising a first plurality of struts and pins arranged in an approximately cross-hatching arrangement;
    at least one clip disposed on the at least one extendable arm;
    at least one utensil compartment disposed on the at least one extendable arm; and
    at least one second extendable arm in mechanical communication with the second channel, and wherein the at least one second extendable arm is a scissoring am comprising a second plurality of struts and pins arranged in an approximately cross-hatching arrangement.

2. The portable music stand extender of claim 1, wherein the utensil compartment provides a friction fit to a utensil to retain the utensil within a utensil cavity.

3. The portable music stand extender of claim 2, wherein the utensil is a writing utensil.

4. The portable music stand extender of claim 3, wherein the kickstand is pivotally engaged, via a pivot and slide, to the rear side of the body portion.

5. The portable music stand extender of claim 4, wherein the kickstand is configurable is retained within a kickstand cavity when not in-use.

6. The portable music stand extender of claim 5, wherein the kickstand is pivoted into one or more in-use positions.

7. A portable music stand extender, comprising:
    a body portion defining a first channel and a second channel and comprising an extension indicator, a kickstand, and a smart device mount;
    a first extendable arm in mechanical communication with the first channel, and wherein the first extendable arm is a scissoring am comprising a plurality of struts and pins arranged in an approximately cross-hatching arrangement;
    a first clip disposed on the first extendable arm;
    a first utensil compartment disposed on the first extendable arm;
    a second extendable arm in mechanical communication with the second channel, and wherein the second extendable arm is a scissoring arm comprising a plurality of struts and pins arranged in an approximately cross-hatching arrangement;
    a second clip disposed on a second extendable arm;
    a second utensil compartment disposed on the second extendable arm; and
    wherein the first extendable arm and the second extendable arm are constructed and arranged to retract and expand to and from the body position.

8. The portable music stand extender of claim 7, wherein a utensil compartment provides a friction fit to a utensil to retain the utensil within a utensil cavity.

9. The portable music stand extender of claim 8, wherein the utensil is a writing utensil.

10. The portable music stand extender of claim 9, wherein the kickstand is pivotally engaged, via a pivot and slide, to the rear side of the body portion.

11. The portable music stand extender of claim 10, wherein the kickstand is configurable is retained within a kickstand cavity when not in-use.

12. The portable music stand extender of claim 11, wherein the kickstand is pivoted into one or more in-use positions.

\* \* \* \* \*